United States Patent
Welsh et al.

(10) Patent No.: US 10,482,228 B2
(45) Date of Patent: Nov. 19, 2019

(54) SYSTEMS AND METHODS FOR AUTHENTICATING USERS IN VIRTUAL REALITY SETTINGS

(71) Applicant: MASTERCARD INTERNATIONAL INCORPORATED, Purchase, NY (US)

(72) Inventors: Tyler C. Welsh, New York, NY (US); Jo-Anne Loh, New York, NY (US); Christine Chu, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 186 days.

(21) Appl. No.: 15/676,017

(22) Filed: Aug. 14, 2017

(65) Prior Publication Data

US 2019/0050547 A1   Feb. 14, 2019

(51) Int. Cl.
| | |
|---|---|
| *G06F 21/00* | (2013.01) |
| *G06F 21/32* | (2013.01) |
| *G06F 3/01* | (2006.01) |
| *G06T 19/00* | (2011.01) |
| *G06Q 20/40* | (2012.01) |
| *G06Q 10/10* | (2012.01) |
| *G06F 21/31* | (2013.01) |

(52) U.S. Cl.
CPC .............. *G06F 21/32* (2013.01); *G06F 3/011* (2013.01); *G06F 3/017* (2013.01); *G06F 21/316* (2013.01); *G06Q 10/10* (2013.01); *G06Q 20/40* (2013.01); *G06Q 20/40145* (2013.01); *G06T 19/006* (2013.01)

(58) Field of Classification Search
CPC ........ G06F 21/32; G06F 3/011; G06T 19/006; G06Q 20/40145
USPC ......................................................... 713/186
See application file for complete search history.

(56) References Cited

U.S. PATENT DOCUMENTS

| | | | |
|---|---|---|---|
| 9,679,197 B1* | 6/2017 | Sills ........................ | G06F 3/017 |
| 2005/0212750 A1* | 9/2005 | Marvit ................... | G06F 1/1613 |
| | | | 345/156 |
| 2011/0029400 A1* | 2/2011 | Scipioni ................. | G06F 21/36 |
| | | | 705/26.4 |

* cited by examiner

*Primary Examiner* — Mohammad W Reza
(74) *Attorney, Agent, or Firm* — Harness, Dickey & Pierce, P.L.C.

(57) ABSTRACT

Systems and methods are provided for authenticating users in virtual settings. One exemplary method includes receiving a network transaction request from a user in a virtual setting and prompting the user for a motion ID associated with an account available for use in the virtual setting to facilitate the network transaction. The method also includes capturing a movement of the user in the virtual setting while masking the movement from other users in the virtual setting. The exemplary method further includes comparing the captured movement to the motion ID and compiling and transmitting an authorization request for the network transaction when the captured movement matches the motion ID.

20 Claims, 4 Drawing Sheets

SYSTEMS AND METHODS FOR AUTHENTICATING USERS IN VIRTUAL REALITY SETTINGS

FIELD

The present disclosure generally relates to systems and methods for authenticating users in virtual reality settings, and in particular, to systems and methods for authenticating the users through identification of their movements in the virtual reality settings (e.g., including virtual reality environments, or augmented reality environments, etc.).

BACKGROUND

This section provides background information related to the present disclosure which is not necessarily prior art.

Consumers are known to use payment accounts to fund transactions for products (e.g., goods and services, etc.) from merchants. In general, at a point of purchase of a product, a consumer provides a payment device and further, often, authenticates himself/herself thereto through a personal identification number (PIN), biometric, or otherwise. Once the consumer is authenticated, or as part of the authentication, the merchant initiates a payment account transaction, for the product, through the point of purchase, whereby, if approved, the consumer takes possession of the product and/or provides directions for the product's delivery to a location identified by the consumer.

Separately, virtual reality and augmented reality environments are known, where software is provided to generate the environments and where the environments may be entire virtual worlds or composites of the real world and the virtual worlds. The environments may be based on a variety of themes, stores, or subject matters, and may be provided for various purposes, such as, for example, education, entertainment, etc. Users are known to enter the environments and interact with the environments, alone or in concert with one or more other users.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When present in virtual reality environments, augmented reality environments, etc. (referred to herein as "virtual settings" or "virtual reality settings"), users often interact with other users or with the virtual settings to accomplish one or more purposes, for example, relating to entertainment, education, training, shopping, etc. As part of the interactions, from time to time, users may desire and/or need to purchase products via the virtual settings (e.g., for use in the virtual settings, or for use in the real world, etc.), whereby the users constitute consumers that may expect to fund transactions for the products with payment accounts. In order to do so, the consumers may be required to authenticate themselves to their payment accounts. In some instances, the consumers may be forced to leave the virtual settings to perform the required authentication, thereby interrupting their virtual reality experiences.

Uniquely, the systems and methods herein facilitate payment account transactions in virtual settings, which permit authentication of consumers to their payment accounts without requiring the consumers to leave the virtual settings and without divulging such authentication information to other users in the virtual settings. In particular, in response to a selection by a consumer to purchase a product within a virtual setting, a virtual host prompts the consumer to perform a motion identity (ID), which is registered to an account for the consumer with a virtual host (or other entity) of the virtual setting. The consumer, in turn, performs a movement, which is captured by the virtual host. While the movement is performed, the virtual host masks the movement from the virtual setting, so that the movement is obscured from other users included in and/or interacting with the virtual setting. The movement is then compared to the motion ID associated with the consumer at his/her account, and when a match is found, the consumer is authenticated. Thereafter, the transaction is initiated through an authorization message to an issuer associated with the consumer's payment account. In this manner, the consumer is able to authenticate himself/herself, while continuing to be present in the virtual setting, yet not risk exposing and/or disclosing authentication information (e.g., the motion ID, etc.) to other users in the virtual setting.

Figure 1:
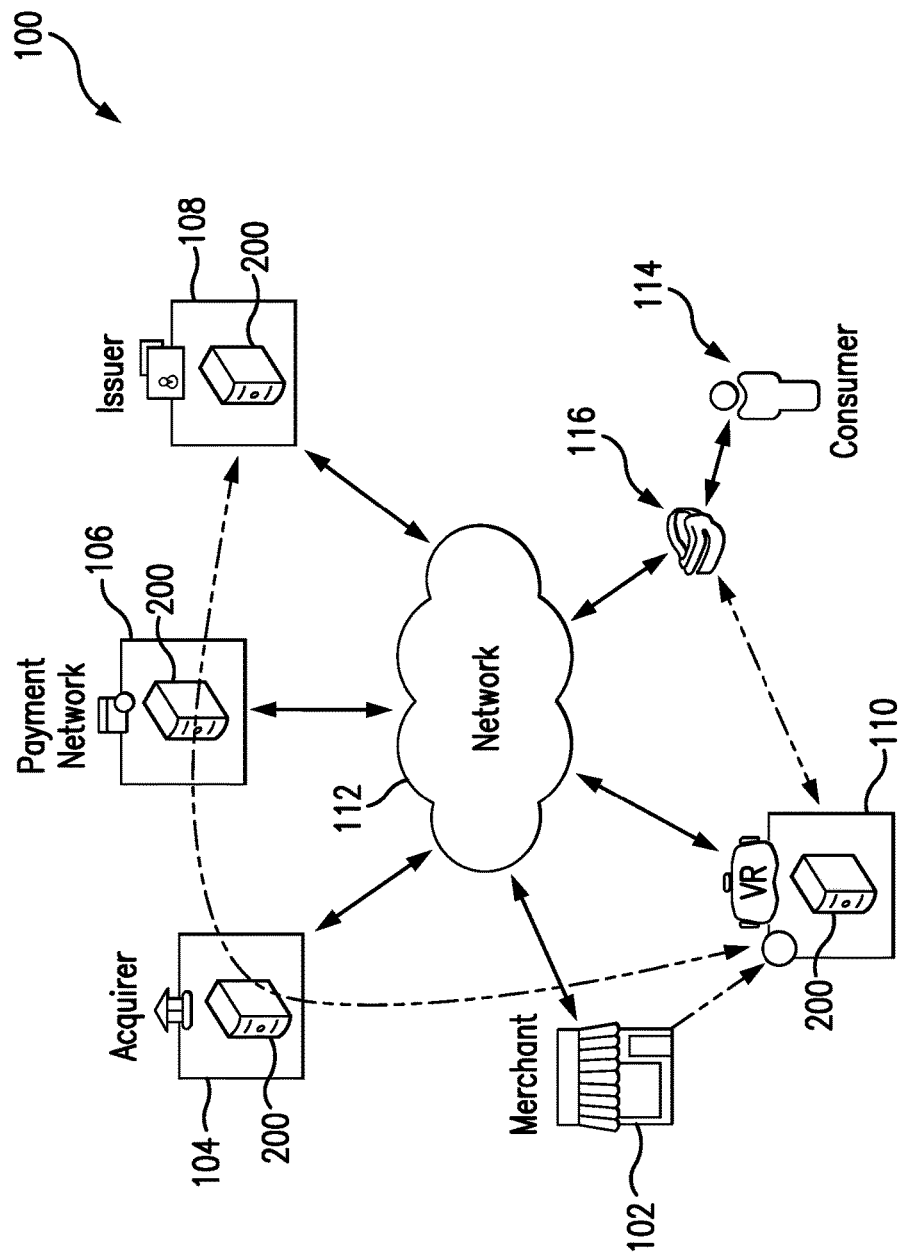
FIG. 1 is a block diagram of an exemplary system of the present disclosure suitable for use in facilitating payment transactions in at least partial virtual reality settings.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, implementation of a virtual host in the system 100, relationships between the virtual host, one or more merchant(s), and/or a payment network in the system 100, etc.

The illustrated system 100 generally includes a merchant 102, an acquirer 104 associated with the merchant 102, a payment network 106, an issuer 108 configured to issue payment accounts (or other accounts) to consumers, and a virtual host 110, each of which is coupled to (and is in communication with) network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 112 may include multiple different networks, such as a private payment transaction network made accessible by the payment network 106 to the acquirer 104 and the issuer 108 and, separately, the public Internet, which may provide interconnection between one or more of the merchant 102, the payment network 106, the virtual host 110, and a consumer 114 (e.g., a communication device 116 associated therewith, etc.), etc.

The merchant 102 is generally provided to offer products (e.g., goods and/or services, etc.) for sale to consumers in the system 100, including to the consumer 114. The merchant 102 may offer the products for sale in physical locations or through virtual locations (e.g., through network-based applications (e.g., website, etc.), etc.), as desired. In addition, in this exemplary embodiment, the merchant 102 is integrated, in whole or in part, with the virtual host 110 (as indicated by the dotted line in FIG. 1 and circle symbol therein), or is at least in agreement with the virtual host 110, such that one or more products offered for sale by the merchant 102 are offered for sale through a virtual setting provided by the virtual host 110 to the consumer 114 and other users, etc.

Also in the system 100, the consumer 114 is associated with a payment account, which is issued by the issuer 108. The payment account may include, for example, a credit account, a debit account, or a prepaid account, etc. The payment account is usable, by the consumer 114, as described in more detail below, to fund payment transactions with the merchant 102 and/or with the virtual host 110, etc. In addition, the communication device 116 associated with the consumer 114 may include one or more different devices, depending on, for example, the type of virtual setting involved in the system 100 (and provided by the virtual host 110), and the accessibility thereof by the consumer 114. As illustrated in FIG. 1, in the illustrated system 100 the communication device 116 includes a headset that may be worn and/or coupled to the consumer 114 and that may be configured to digitally map spatial coordinates in front thereof (in association with a virtual setting, for example, experienced via the communication device 116). In addition, the headset may be configured to aid the consumer 114 in making movements in a virtual setting and/or in providing feedback for the consumer's movements in the virtual setting (based on the mapped special coordinates, etc.). In other embodiments, the communication device 116 may alternatively (or additionally) include gloves, a suit, a smartphone or tablet (with a camera to facilitate augmented reality environments and to project and/or measure movement of the consumer 114, etc.), etc. Regardless, the communication device 116 may communicate to the virtual host 110, via one or more networks (e.g., the network 112, etc.), as indicated by the dotted line in FIG. 1, directly or through an intermediary (e.g., through a service provider, a separate virtual host, etc.).

In the exemplary embodiment, the virtual host 110 is configured to provide a virtual setting, via the communication device 116, for the consumer 114. And, by interaction with the communication device 116, the virtual host 110 is configured to provide the virtual setting to the consumer 114. As explained above, the virtual setting may include a virtual reality environment, which generally includes an entire virtual world, or the virtual setting may include one or more augmented reality environments, which includes a composite of the real world and a virtual world, etc. The virtual setting may be defined by a variety of themes, subject matter, stories, etc., and may be specific to a purpose of the virtual setting (e.g., education, entertainment, training, etc.). And, within the virtual setting, the consumer 114 may be a person, or animal, or other character specific to the store of the virtual setting (e.g., specific to the merchant 102, etc.).

As is generally known, when the consumer 114 makes use of the communication device 116 in connection with the virtual setting, the consumer's movement, be it movement of his/her arms, hands, etc. or movement from one location to another, is generally captured by the virtual host 110 (via the communication device 116) and rendered into the virtual setting. As an example, when the communication device 116 includes a headset and a virtual glove, the consumer 114 may raise his arm in the real world to emulate catching a ball in the virtual setting. In so doing, the virtual host 110 may render the consumer's arm as being raised in the virtual setting (i.e., the arm of the consumer's character in the virtual setting) to meet and catch the ball, which then provides tactile response to the virtual glove when the ball "hits" the consumer's hand in the virtual setting. What's more, the movement of the ball and the consumer's arm (i.e., the arm of the virtual character associated with the consumer 114), and the catch of the ball, are rendered by the virtual host 110 into the virtual setting to be seen by other users in the virtual setting. With that said, it should be appreciated that content of the virtual setting, as provided by the virtual host 110 and as viewed by the consumer 114 and other users, is almost limitless.

In addition, in connection with the consumer 114 participating in the virtual setting provided by the virtual host 110, the consumer 114 is registered to the virtual host 110, whereby the consumer 114 maintains an account with the virtual host 110 (e.g., a virtual account or virtual reality account, etc.). When the consumer 114 desires to enter the virtual setting (or any other virtual setting available to the consumer 114 from the virtual host 110), the virtual host 110 may require the consumer 114 to provide credentials (e.g., a username, a password, a personal identification number (PIN), etc.) to enter the virtual setting (e.g., login, etc.). The virtual account for the consumer 114 includes, without limitation, preferences and/or features associated with the consumer 114, which define the virtual setting (e.g., devices, stories, themes, subject matters, levels, statuses, characters, etc.) and one or more credentials associated with the consumer's payment account (as issued by the issuer 108). The payment account credentials may include, for example, a primary account number (PAN), an expiration date, a card verification code (CVC), a token, etc. As an example, upon registering with the virtual host 110, the consumer 114 may provide payment account credentials for his/her payment account to the virtual host 110 (for association with the consumer's virtual account) and request that a token be provisioned to the virtual host 110 for association with the payment account. In response, the virtual host 110 communicates with the issuer 108, via the payment network 106, to verify the status of the consumer's payment account and, when verified, the payment network 106 provisions the token for the payment account to the virtual host 110. The virtual host 110 stores the token in association with the consumer's virtual account (e.g., in memory at the communication device 116, in memory at the virtual host 110, in memory at another part of the system 100, etc.).

Further in the system 100, the consumer's account at the virtual host 110 also includes a motion ID for the consumer 114. In particular a motion ID may be a particular hand, foot, or body motion, which is known to and repeatable by, the consumer 114. The motion ID is generally secret to the consumer 114 and unknown to others. With that said, in this exemplary embodiment, when the consumer 114 adds the payment account to his/her account with the virtual host 110, the virtual host 110 is configured to prompt the consumer 114 to provide a corresponding motion ID for the payment account (the capture of which is generally described below and in the method 300). In doing so, the consumer 114 is invited into the virtual setting, and is then prompted to set the motion ID while in the virtual setting. In response to the consumer's motion, the virtual host 110 is configured to capture the consumer's movement, while masking the movement from the virtual setting, and then to store the movement as a reference movement for the consumer's motion ID (or, more specifically, to coordinate mapping of the reference movement as the motion ID) to a memory (e.g., the memory 204, described below) as associated with the motion ID and/or the payment account (e.g., for storage at the payment network 106, at the virtual host 110, etc.). The virtual host 110 may invite the consumer 114 to provide a separate motion ID for each payment account to be added to the consumer's virtual account, or may permit one motion ID to be used for multiple different payment accounts.

For example, the virtual setting provided by the virtual host 110 may generally be defined by a three-dimensional grid, extending in the X, Y and Z directions. As such, when the consumer 114 performs the reference movement associated with his/her motion ID within the virtual setting, the consumer 114 travels (e.g., one of the consumer's hands moves, etc.) from one coordinate in the three-dimensional grid (such as a starting coordinate), through one or multiple intermediate points or coordinates in the three-dimension grid, to a stopping point or coordinate. Additionally, the communication device 116 (through which the consumer 114 is participating in the virtual setting) includes one or more sensors associated with the consumer 114 (e.g., a glove sensor associated with the consumer's hand, etc.), whereby the specific movement of the consumer 114, and the corresponding coordinates through which the consumer 114 moves, are captured by the virtual host 110 (via the sensors) and are stored in memory (e.g., memory 204 at the virtual host 110, etc.) as a reference movement for the consumer's motion ID.

As generally described above, the virtual host 110 is provided as a separate part of the exemplary system 100 but may be incorporated, partly or entirely, into the merchant 102, for example. Additionally, or alternatively, the virtual host 110 may be incorporated, partly or entirely, into the payment network 106 in other system embodiments. With that said, it should be appreciated that the virtual host 110 may also be associated with, or incorporated with, other parts of the system 100, in other embodiments, including, for example, one or more of the acquirer 104, the issuer 108, or one or more other merchants, or collections of merchants (e.g., as part of a virtual shopping center, etc.), etc. In one exemplary implementation, the authentication aspect, or more broadly, the payment aspect, of the virtual host 110, as described herein, may be implemented as a service, by the payment network 106, for example, and made accessible to one or more other virtual hosts, which coordinate the other aspects of the virtual setting described herein, via an application programming interface, or API, for example. In this manner, the other virtual hosts may subscribe to the payment network 106 and/or the service, to integrate the payment aspect of the virtual host 110 into the virtual setting provided by the other virtual hosts.

While only one merchant 102, one acquirer 104, one payment network 106, one issuer 108 and one virtual host 110 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 and/or other system embodiments will generally include multiple consumers, each associated with a payment account and a communication device, and multiple merchants associated with one or more virtual settings.

Figure 2:
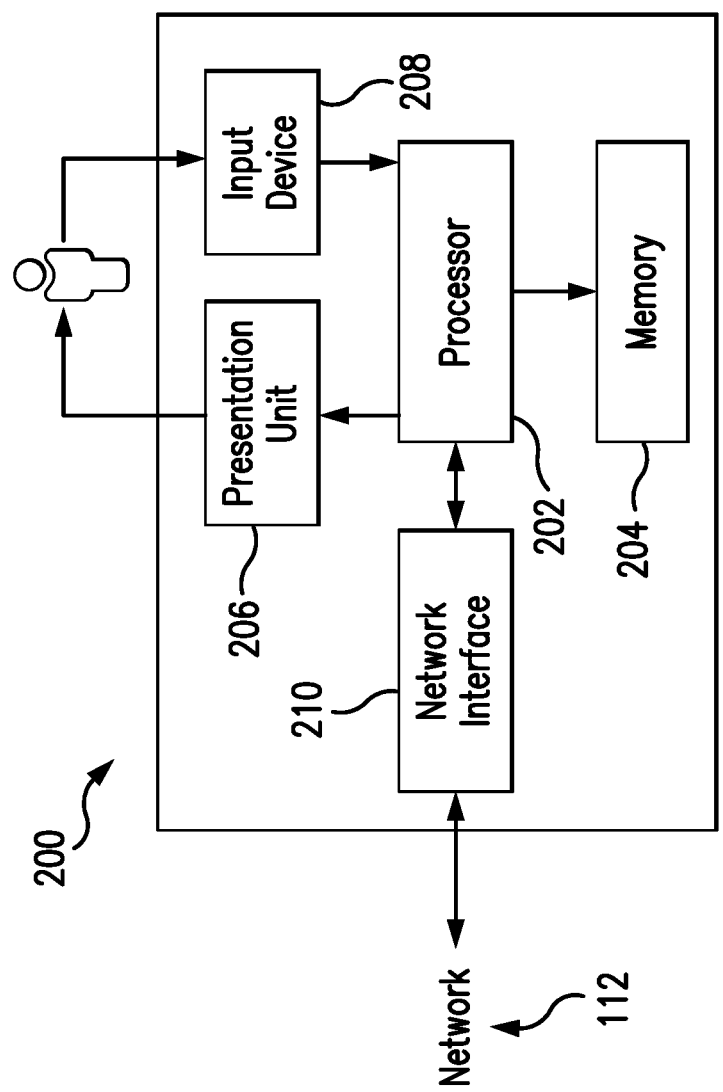
FIG. 2 is a block diagram of a computing device that may be used in the exemplary system of FIG. 1.

FIG. 2 illustrates an exemplary computing device 200 that may be used in the system 100. The computing device 200 may include, for example, one or more servers, workstations, personal computers, laptops, tablets, smartphones, virtual reality devices (e.g., headsets, gloves, suits, etc.), etc. In addition, the computing device 200 may include a single computing device, or it may include multiple computing devices located in close proximity or distributed over a geographic region, so long as the computing devices are specifically configured to operate as described herein. In the exemplary embodiment of FIG. 1, each of the acquirer 104, the payment network 106, the issuer 108, and the virtual host 110 are illustrated as including, or are generally implemented in, computing device 200, coupled to (and in communication with) the network 112. In addition, the merchant 102 may include and/or may be implemented in a computing device consistent with the computing device 200. Further, the communication device 116 associated with consumer 114 can also be considered a computing device consistent with computing device 200. However, with that said, the system 100 should not be considered to be limited to the computing device 200, as described below, as different computing devices and/or arrangements of computing devices may be used.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, payment account credentials, themes, stories, characters, preferences, products for sale (e.g., product names, SKUs, product IDs, model numbers, prices, descriptions, etc.), motion IDs for consumers and users, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, such as virtual settings (e.g., as defined by the virtual host 110, etc.), visually, for example, to a user of the computing device 200, such as the consumer 114 in the system 100 (e.g., at the communication device 116, etc.), etc. The presentation unit 206 may include, without limitation, a liquid crystal display (LCD), a light-emitting diode (LED) display, an organic LED (OLED) display, an "electronic ink" display, speakers, virtual reality headsets, virtual reality suits, virtual reality platforms/apparatuses, etc. In some embodiments, presentation unit 206 may include multiple devices.

In addition, the computing device 200 includes an input device 208 that receives inputs from the user of the computing device 200 (i.e., user inputs) such as, for example, selections of products, authentication movements, etc., as further described below. The input device 208 may include a single input device or multiple input devices. The input device 208 is coupled to (and is in communication with) the processor 202 and may include, for example, one or more of a keyboard, a pointing device, a mouse, a stylus, virtual reality headsets, virtual reality suits, virtual reality platforms/apparatuses, position sensors, motion sensors, etc., a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both a presentation unit and an input device.

Further, the illustrated computing device 200 also includes a network interface 210 coupled to (and in communication with) the processor 202 and the memory 204. The network interface 210 may include, without limitation, a wired network adapter, a wireless network adapter (e.g., Wi-Fi adapter, a near field communication (NFC) adapter, a Bluetooth adapter, etc.), a mobile network adapter, or other device capable of communicating to one or more different networks, including the network 112. Further, in some exemplary embodiments, the computing device 200 includes the processor 202 and one or more network interfaces incorporated into or with the processor 202. In various embodiments, the computing device 200 includes a global positioning system (GPS) capability whereby the computing device 200 may determine its current geographic location, perform mapping applications, etc. For example, the virtual host 110 may utilize the GPS capability of the communication device 116 in connection with providing the virtual setting to the consumer 114, etc.

Referring again to FIG. 1, when the consumer 114 enters the virtual setting, as provided by the virtual host 110, the consumer 114 may interact with the virtual setting as desired, for example, by pursuing a story line, or engaging in education and/or training lessons, etc. At some time, while interacting with the virtual setting, the consumer 114 may encounter a product offered for sale by the merchant 102 (e.g., by interaction between the merchant 102 and the virtual host 110, or by placement of the product by the virtual host 110 in the virtual setting (e.g., as part of an advertisement or other use of the product in the virtual setting, etc.), etc.). Upon the consumer 114 interacting with the product, or otherwise noting or expressing interest in the product, the virtual host 110 is configured to present an option, in the virtual setting, to the consumer 114 for purchase of the product. In response, the consumer 114 may continue in his/her interaction with the virtual setting, or the consumer 114 may select (e.g., by a hand movement, etc.) the option to purchase the product.

In connection therewith, when the consumer selects to purchase the product in the virtual setting, the virtual host 110 is configured to prompt the consumer 114 to perform the motion ID registered to the consumer 114 and/or the payment account, while present in the virtual setting. The prompt will include, generally, instructions for the consumer 114 to perform the authentication movement, such as for example, "Please perform Motion ID with your right hand." Thereafter, the consumer 114 performs the movement within the virtual setting, during which the virtual host 110 is configured to mask the movement of the consumer's right hand (or other body part) from the virtual setting (i.e., so that it is not viewable and/or perceivable by other users in the virtual setting). For example, in response to prompting the consumer 114 to perform the motion ID, the virtual host 110 may be configured to show the consumer's right hand (or other body part) within the virtual setting as not moving, or the virtual host 110 may be configured to replace or cover the consumer's right hand (or other body part) by a facade of a suitable shape and/or size, etc.

The virtual host 110 is further configured to then capture the movement performed by the consumer 114 (e.g., via tracking coordinates of the consumer's right hand, etc.), to compare the captured movement to the motion ID (and the consumer's corresponding reference motion associated therewith, for example, based on a comparison of coordinates associated with both) stored in memory 204 (as part of the consumer's virtual account), and to transmit an authorization request (broadly, an authorization message) for the purchase of the product to the acquirer 104, along path A as referenced in FIG. 1, when the captured movement matches the motion ID (e.g., exactly matches, matches within a suitable margin of error as described hereinafter, etc.). While the above is described as the virtual host 110 comparing the captured movement to the reference movement for the motion ID, it should be appreciated that in various embodiments such comparison may instead be performed at the communication device 116 (with the reference movement for the motion ID being stored at the communication device 116 or transmitted thereto by the virtual host 110 or payment network, etc.). This comparison is described in more detail in connection with the method 300.

When the virtual host 110 determines that the movement captured from the consumer 114 matches the reference movement for the consumer's motion ID (in response to the consumer's request to purchase the product at the merchant 102), the virtual host 110 generates an authorization request for the purchase of the product (either directly or in cooperation with the merchant 102) and transmits the authorization request to the acquirer 104. The authorization request generally includes credential(s) associated with the consumer's payment account (for example, the token associated with the consumer's payment account, as retrieved from the consumer's virtual account at the virtual host 110, along with a cryptogram specific to the given transaction), the amount of the transaction, and an acquirer ID, and may additionally include (although these are not required) a date/time of the transaction, a terminal ID (associated with the virtual host 110 or merchant 102), an indication that the consumer 114 has been authenticated via the motion ID, and particular details of the motion ID comparison (e.g., thereby providing the issuer 108 with additional information for use in approving, or not, the transaction; thereby providing additional information for use in data analytics; etc.), etc. In turn, the acquirer 104 communicates the authorization request with the issuer 108 (associated with the consumer's payment account), through the payment network 106 (e.g., through MasterCard®, VISA®, Discover®, American Express®, etc.), to determine whether the payment account is in good standing and whether there are sufficient funds and/or credit to cover the transaction. In turn, if the transaction is approved, an authorization reply (broadly, an authorization message) indicating the approval of the transaction is transmitted back from the issuer 108 to the virtual host 110, along path A, thereby permitting the virtual host 110 to notify the consumer 114, in the virtual setting, of the successful purchase. The transaction is later cleared and/or settled by and between the merchant 102, the acquirer 104, and the issuer 108 by appropriate agreements. If the transaction is declined, however, the authorization reply (indicating the decline of the transaction) is provided back to the virtual host 110, along the path A, thereby permitting the virtual host 110 to halt or terminate the transaction and/or notify the consumer 114 of the same in the virtual setting.

It should be appreciated that, while in the above description the authorization request is transmitted by the virtual host 110 to the acquirer 104, in other examples the virtual host 110 may instead introduce the authorization message to the payment network 106 via another entity, or potentially even directly to the payment network 106, whereby the authorization request is then transmitted by the payment network 106 along to the issuer 108, for approval or decline, as described.

Figure 3:
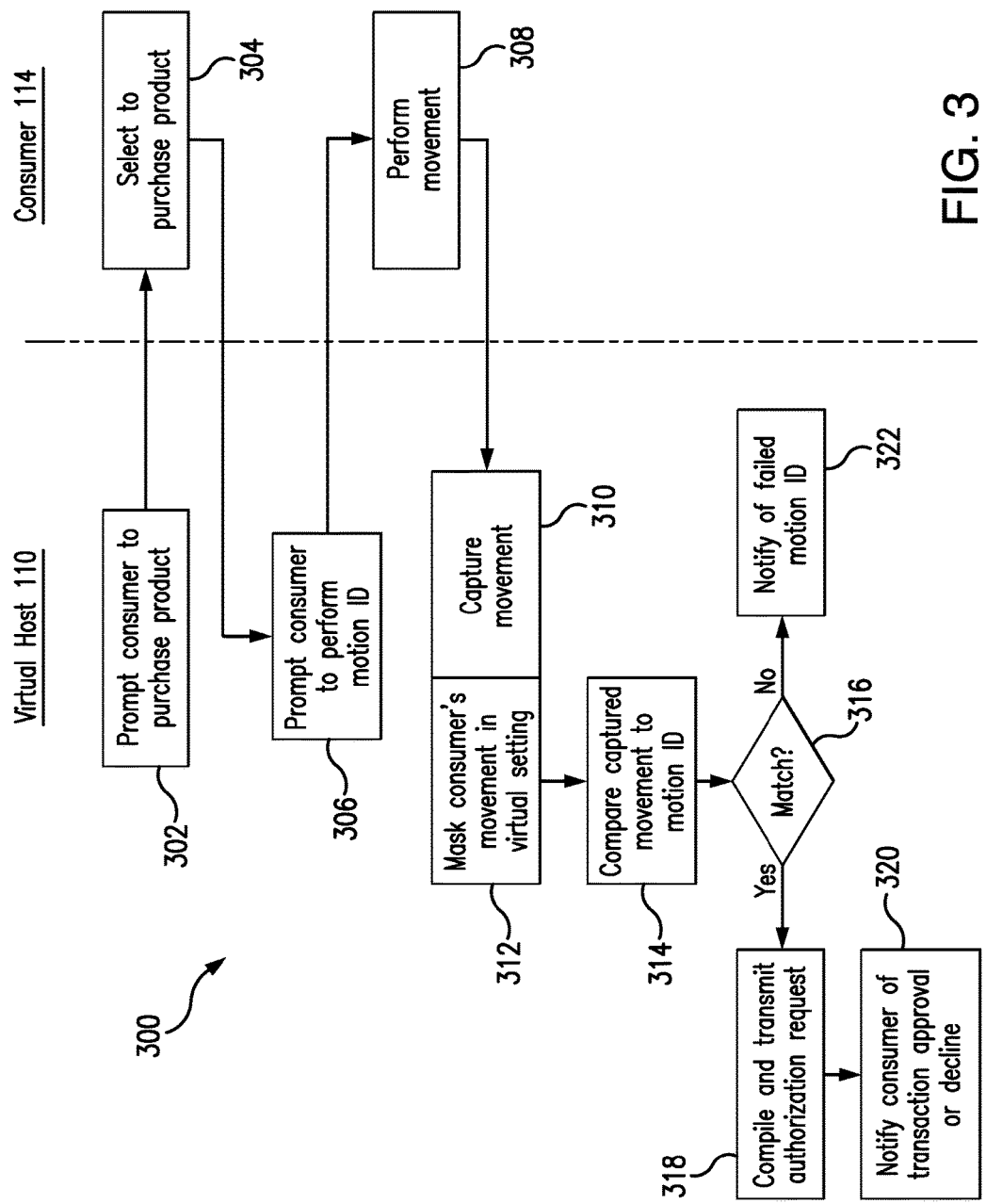
FIG. 3 is a flow diagram of an exemplary method, which may be implemented in connection with the system of FIG. 1, for facilitating payment transactions in at least partial virtual reality settings.

FIG. 3 illustrates an exemplary method 300 for use in authenticating consumers in virtual settings in connection with facilitating payment account transactions by the consumers in the virtual settings. The exemplary method 300 is described as implemented in the virtual host 110 of the system 100, in conjunction with the consumer 114 and the consumer's communication device 116. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the exemplary method 300.

In this exemplary embodiment, the consumer 114 is interacting with the communication device 116 and, thereby, is participating in the virtual setting provided by the virtual host 110. In addition in this embodiment, the virtual setting includes the merchant 102, which is offering products, in the virtual setting, for sale to consumers, including the consumer 114. The products may include one or more "virtual" products, which may be used in or related to the virtual setting (e.g., game scenarios, power-ups in games, etc.), or one or more "real" products (e.g., music, clothing, etc.), which may be received and/or delivered outside the virtual setting, or combinations of both virtual products and real products, or any other suitable products. As an example, the merchant 102 may offer clothing for sale, and the consumer 114 may desire to purchase the clothing.

In response in the method 300, at 302, the virtual host 110 prompts the consumer 114, at the communication device 116, to purchase the product within the virtual setting. The prompt may include a question posed to the consumer 114, in the virtual setting, asking the consumer 114 if he/she is interested in purchasing the product with input options such as "Yes" or "No" disposed proximate to the consumer 114 for selection. Because the consumer 114 desires to purchase the product in this example, the consumer 114, in the virtual setting, selects, at 304, to purchase the product (e.g., via the "Yes" input option in the virtual setting, etc.). Optionally, when multiple payment accounts are registered to the consumer's virtual account with the virtual host 110, in addition to prompting the consumer 114 to select to purchase the product, the virtual host 110 may also prompt the consumer 114 to select a payment account (from the multiple payment accounts) to fund the purchase (e.g., via a display or text board in the virtual setting at which the consumer 114 can select the desired payment account, etc.). Additional interactions between the virtual host 110 (and/or the merchant 102) and the consumer 114, via the communication device 116, may be included, as needed, or desired, to provide information associated with the product (e.g., a selection of color, a selection of size, etc.), to provide information associated with delivery of the product (e.g., entry of an address for delivery, etc.), or to provide other relevant information, etc. In general, the information will be solicited and/or provided through the virtual setting, and through various options included therein (e.g., graphical buttons, etc.), by the consumer 114, via the communication device 116.

Next, the virtual host 110 prompts the consumer 114, at 306, within the virtual setting, to perform the motion ID registered to and/or associated with the consumer's virtual account and/or the consumer's payment account. In one example, a prompt text board appears in the virtual setting for viewing by the consumer 114, with the instruction to "Perform your Motion ID with your right hand." A timer or countdown may also be included therewith, such that the consumer 114 has a limited time frame in which to perform the movement (or motion ID) (e.g., five seconds, ten seconds, fifteen seconds, thirty seconds, etc.). It should be understood that the instruction (broadly, the prompt) provided to the consumer 114 may be otherwise, for example, when the motion ID is otherwise, etc. In a variety of examples, the motion ID may involve movement of the consumer's left hand, or movement of a foot of the consumer (or feet of the consumer), or the consumer's torso, or the consumer's whole body, or various combinations thereof. In general, though, the motion ID includes a motion that may be performed by the consumer 114, that may be understood by the virtual host 110, and that may be repeatable, so that the consumer 114 is able to recall and/or perform the same, to authenticate himself/herself, as provided herein.

In response, the consumer 114 performs a movement, at 308, with his/her right hand (or other body part or body) consistent with his/her motion ID (and consistent with the prompt provided by the virtual host 110). In turn, at 310, the virtual host 110 captures the movement of the consumer 114 (e.g., captures special coordinates for the movement as defined by the virtual setting, translates the movement to special coordinates defined by the virtual setting, etc.). However, if the consumer 114 fails to perform the movement or fails to complete the movement in an allotted time frame or fails to perform the movement within a delineated zone (e.g., a region in front of the consumer 114, etc.), for example, the virtual host 110 may inform the consumer 114, through the virtual setting, that an error has occurred and prompt the consumer 114 to again provide the movement. Alternatively, the virtual host 110 may terminate the transaction process for the product (e.g., if multiple errors occur in connection with prompting the consumer 114 for his/her motion ID whereby the virtual host 110 is unable to capture the movement of the consumer 114, etc.).

As an example, the virtual host 110 may provide an instruction to the consumer 114, within the virtual setting, to "Perform your Motion ID with your right hand," and provide a countdown of five seconds after which the consumer 114 is intended to perform the motion ID. Then, the virtual host 110 may provide the consumer 114 a duration of ten seconds to actually perform the motion ID. In connection therewith (and as generally described above), the virtual setting is generally defined by a three-dimensional grid, extending in the X, Y and Z directions. As such, when the consumer 114 performs the movement associated with his/her motion ID, the right hand (and the fingers and/or other parts thereof) travels from one coordinate in the three-dimensional grid (such as a starting coordinate), through one or multiple subsequent points or coordinates in the three-dimension grid, to a stopping point or coordinate within the three-dimension grid. Additionally, the communication device 116 (through which the consumer 114 is participating in the virtual setting) includes one or more sensors associated with the consumer's right hand (e.g., via a glove, etc.), whereby the specific movement of the consumer 114, and the corresponding coordinates of the consumer's right hand associated with the movement (at each location in the three-dimension grid during the movement), are captured by the virtual host 110 and are stored in memory (e.g., memory 204 at the virtual host 110, etc.). With that said, while the above is described with reference to movement of the consumer's right hand, it should be appreciated that the same applies to movement of any part of the consumer 114 and/or the consumer's body.

Figure 4:
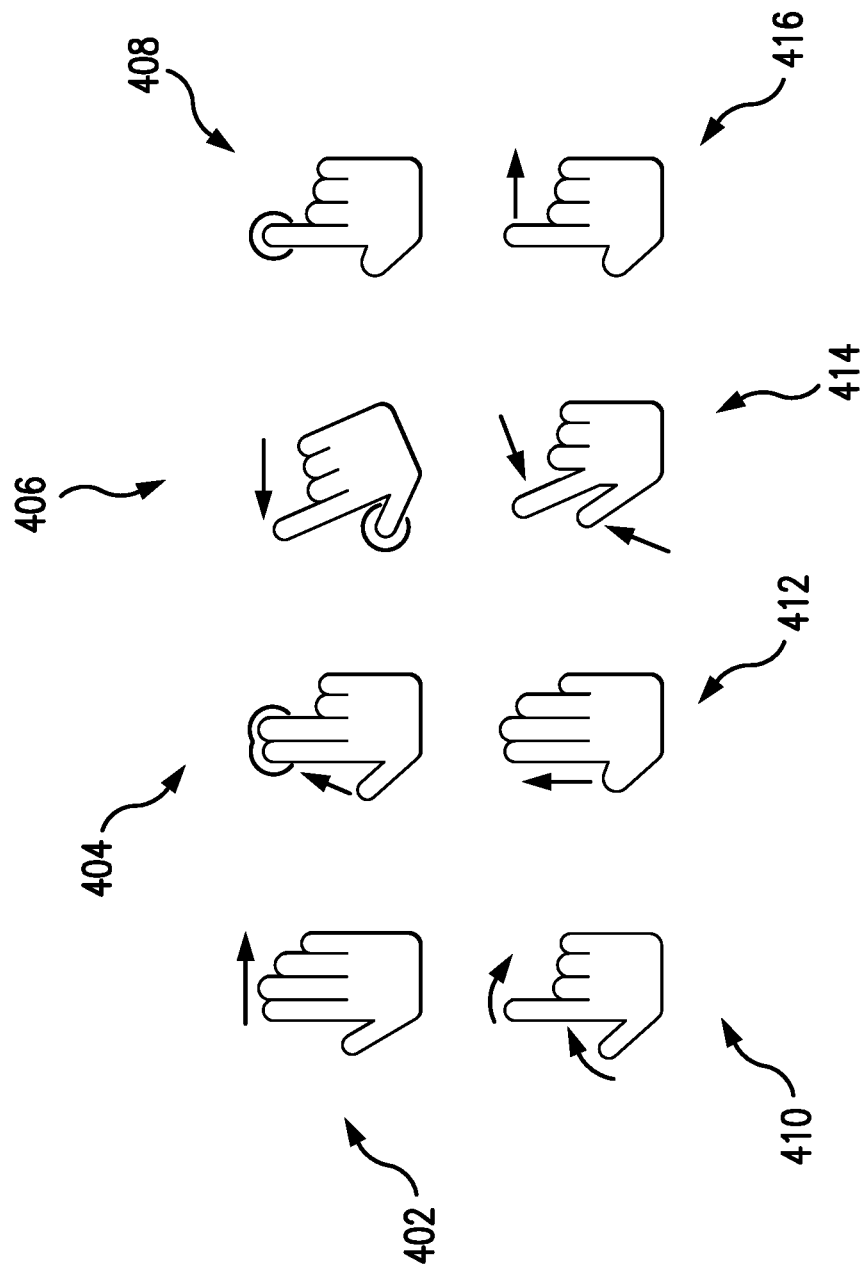
FIG. 4 illustrates multiple exemplary hand motions, which may define a motion identity (ID), and may be used in connection with the method of FIG. 3.

FIG. 4 illustrates multiple exemplary right hand motions which may, alone or in combination, form a motion ID for the consumer 114. As shown at 402, a motion may include a movement (as indicated by the arrow) of the whole hand generally right. As shown at 404, a motion may include a movement of the thumb generally toward the index finger and middle finger (as indicated by the arrow), together with a tapping movement of the index finger and middle finger (as indicated by the circles). As shown at 406, another motion may include a movement of the index finger and thumb generally left (as indicated by the arrow), together with a tapping movement of the thumb (as indicated by the circle). As shown at 408, a motion may include a tapping movement of the index finger (as indicated by the circle). As shown at 410, a motion may include a movement of the index finger generally right and a movement of the thumb generally toward the index finger (as indicated by the arrows). As shown at 412, still another motion may include a movement of the index finger, middle finger, and ring finger generally upward or forward (as indicated by the arrow). As shown at 414, a motion may include a movement of the index finger generally left and a movement of the thumb generally toward the index finger (as indicated by the arrows). And, as shown at 416, another motion may include a movement of the index finger generally right (as indicated by the arrow). Again, it should be appreciated that the exemplary right hand motions illustrated at 402-416 are not limiting in nature and that other motions and/or movements (by the right hand, the left hand, other body parts, etc.) may be used, alone or in combination, to form a motion ID for the consumer 114.

With reference again to FIG. 3, meanwhile in the method 300, while the virtual host 110 is capturing the consumer's movement associated with the consumer's motion ID, the virtual host 110 is also masking, at 312, the consumer's movement from the virtual setting. For instance, in the above example, in response to the prompt (e.g., at 302, etc.), the virtual host 110 identifies the movement(s) of the consumer's right hand (and/or multiple fingers of the right hand) and, instead of modifying the virtual setting to reflect the actual movement of the consumer's right hand, maintains the right hand in its original position in the rendering of the virtual setting or in some other position that is not indicative of the movement(s) being made by the right hand in performing the motion ID (e.g., the virtual host 110 may maintain both of the consumer's hands at his/her side during the process of capturing the consumer's movement relating to the motion ID, etc.). Additionally, or alternatively, the virtual host 110 may block or mask or otherwise cover (or conceal) the right hand of the consumer 114, in the virtual setting, such that a facade is generally applied to the right hand (broadly, on a location of the consumer (or on a body part thereof)), so that the movement(s) being performed by the consumer 114 in connection with providing his/her motion ID is not viewable or perceivable in the virtual setting (or such that the consumer 114 appears to not be doing anything, etc.). In general, this masking may be done from the time the virtual host 110 initially prompts the consumer 114 to provide the motion ID up to expiration of the time provided to the consumer 114 to perform the corresponding motion (or the masking may be done for other periods based on desired security, etc.).

Then, after the movement of the consumer 114 associated with his/her motion ID is successfully captured by the virtual host 110 (e.g., after the coordinates associated with the consumer's movement within the virtual setting are captured, etc.), the virtual host 110 compares, at 314, the captured movement to the consumer's motion ID.

For example, as described above, the virtual setting provided by the virtual host 110 may generally be defined by a three-dimensional grid, extending in the X, Y and Z directions. As such, the movement of the consumer 114 captured by the virtual host 110 may generally associated with and/or represented by (and/or translated to) multiple coordinates within the three-dimensional grid. In connection therewith, the captured movement coordinates are then compared to corresponding reference coordinates for the consumer's motion ID (e.g., as captured from the consumer 114 during registration of the consumer 114 to the virtual host 110 (and in connection with creating the consumer's virtual account), or thereafter, etc.). In the comparison, one or more thresholds may be applied to the coordinates and/or the coordinate map of the three-dimensional grid, whereby a slight or minor variation between the consumer's captured coordinates and the reference coordinates for the consumer's motion ID (which would not be considered a distinct movement) are taken into account (e.g., as an acceptable margin of error, etc.). In particular, the spatial coordinates may include a mapped margin of error from multiple inputs of the reference movement for the consumer's motion ID (e.g., one standard deviation, etc.). As such, in this example, it is contemplated that the consumer 114 may be authenticated herein even if the captured movement coordinates for the consumer 114 do not exactly match the reference coordinates for the consumer's motion ID. What's more, as part of the comparison in this example (and as part of translating the consumer's captured movement to the desired coordinates), the virtual host 110 may also detect movement frequency time frames associated with the movement of the consumer 114 (e.g., to analyze how quickly the movement is and to determine that the movement is a proper movement for the motion ID, etc.), and then calculate a distance and speed of the movement (which can then also or alternatively be used in the comparison).

When the captured movement of the consumer 114 matches the consumer's motion ID, at 316, the virtual host 110 compiles, at 318 (either directly or in cooperation with the merchant 102) an authorization request for the transaction and transmits the authorization request, at 318, to the acquirer 104. The authorization request may include, for example, the token associated with the consumer's payment account and provisioned to the virtual host 110 (or other credential for the payment account), a transaction amount, a date/time of the transaction, a terminal ID (associated with the virtual host 110 or merchant 102), an acquirer ID, a merchant account number, etc. Further, the authorization request may include an authentication indicator, indicative of a successful, or unsuccessful, authentication of the consumer 114 based on the motion ID. Often, the authorization request will be consistent with the ISO 8583 standard (e.g., an 0100 authorization message, etc.), and the authentication indicator will be included in a particular data element (DE) of the authorization request (e.g., DE 48, etc.) (e.g., in a similar fashion to digital transactions, etc.). As described above in the system 100, the acquirer 104 then communicates the authorization request to the issuer 108, via the payment network 106. The issuer 108, in turn, determines whether to approve or decline the transaction (e.g., potentially relying on the authentication in the virtual setting, etc.). And based thereon, the issuer transmits an authorization reply back to the virtual host 110, whereby the virtual host 110 is notified of the approval, or decline, of the transaction. Then, at 320, the virtual host 110 notifies the consumer 114, via an interface within the virtual setting, of the approval, or decline, of the transaction by the issuer 108, without the consumer 114 having to leave the virtual setting.

Alternatively in the method 300, when the captured movement of the consumer 114 does not match the consumer's motion ID, at 316, the virtual host 110 notifies, at 322, the consumer 114, via an interface within the virtual setting, of the failed motion ID, and thus, the failed authentication. In so doing, the virtual host 110 may prompt the consumer 114 to again provide the movement (e.g., via a message in the virtual setting indicating "Please try again", etc.). Or, the virtual host 110 may simply terminate the transaction.

In view of the above, the systems and methods herein permit consumers, while present in virtual settings (and without having to leave the virtual settings), to authenticate themselves in connection with payment account transactions. Specifically, by permitting a consumer to provide a movement (intended to match a motion ID), and then masking the consumer's performance of the movement within the virtual setting, a virtual host providing the virtual setting enables authentication of the consumer via the technology underlying the virtual setting as a new application thereof. Further, the virtual host permits the authentication without the consumer having to exit the virtual setting (i.e., without disrupting the consumer's virtual experience), while still persevering the privacy and/or secrecy of the consumer's motion ID from those present with the consumer in the virtual setting.

Again, and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, at a computing device, from a user (e.g., a consumer, etc.) in a virtual reality setting, a network transaction request (e.g., a selection to purchase a product, etc.); (b) prompting, by the computing device, the user for a motion ID associated with at least one account (e.g., a payment account, etc.) available for use in the virtual reality setting to facilitate the network transaction (e.g., to purchase the product, etc.), the motion ID defining a reference movement of at least one body part of the user in the virtual reality setting; (c) capturing a movement of the at least one body part of the user in the virtual reality setting; (d) masking, by the computing device, the captured movement of the at least one body part of the user in the virtual reality setting, whereby another user included in the virtual reality setting is unable to perceive the captured movement of the at least one body part of the user; (e) comparing the captured movement of the at least one body part of the user to the reference movement defined by the motion ID, to thereby authenticate the user, or not, to the at least one account; and (f) causing an authorization request to be compiled for the network transaction (e.g., for the purchase of the product, etc.) and transmitted when the captured movement of the at least one body part of the user matches the reference movement defined by the motion ID and the user is authenticated (e.g., thereby initiating the transaction for the purchase of the product funded by the at least one payment account, etc.).

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art, that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only, and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for use in authenticating a user in a virtual reality setting in connection with a network transaction in the virtual reality setting, the computer-implemented method comprising:
   receiving a network transaction request, at a computing device, from a user in a virtual reality setting;
   prompting, by the computing device, the user for a motion ID associated with at least one account available for use in the virtual reality setting to facilitate the network transaction, the motion ID defining a reference movement of at least one body part of the user in the virtual reality setting;
   capturing a movement of the at least one body part of the user in the virtual reality setting;
   masking, by the computing device, the movement of the at least one body part of the user in the virtual reality setting, such that another user included in the virtual reality setting is unable to perceive the movement of the at least one body part of the user in the virtual reality setting;
   comparing the captured movement of the at least one body part of the user to the reference movement defined by the motion ID, to thereby authenticate the user, or not, to the at least one account; and
   causing an authorization request to be compiled for the network transaction and transmitted when the captured movement of the at least one body part of the user matches the reference movement defined by the motion ID and the user is authenticated.

2. The method of claim 1, further comprising receiving, at the computing device, a selection of the at least one account; and
   causing a credential associated with the selected at least one account to be included in the authorization request.

3. The method of claim 2, wherein capturing the movement of the at least one body part of the user in the virtual reality setting includes capturing coordinates associated with the at least one body part of the user in the virtual reality setting at different locations in the virtual reality setting during said movement.

4. The method of claim 1, wherein masking the movement of the at least one body part of the user in the virtual setting includes filtering said movement of the at least one body part of the user in the virtual reality setting, when rendering the virtual reality setting, based on general movement by the user.

5. The method of claim 1, wherein masking the movement of the at least one body part of the user in the virtual reality setting includes imposing a facade on the virtual reality setting at a location of the at least one body part of the user.

6. The method of claim 1, wherein comparing the captured movement of the at least one body part of the user to the reference movement defined by the motion ID includes applying at least one margin of error threshold, whereby the captured movement is permitted to match the reference movement defined by the motion ID even when not identical to the reference movement defined by the motion ID.

7. The method of claim 6, wherein the at least one body part includes a hand and multiple fingers of the user.

8. The method of claim 1, wherein causing the authorization request to be compiled and transmitting the authorization request includes compiling the authorization request for a purchase of a product by the user in the virtual reality setting and transmitting the authorization request to an acquirer associated with a merchant offering the product for sale in the virtual reality setting; and
   wherein the authorization request includes an authentication indicator associated with the match between the captured movement of the at least one body part of the user and the reference movement defined by the motion ID.

9. A system for use in facilitating a payment account transaction within a virtual reality setting, the system comprising:
   a memory including a virtual reality account for a consumer, the virtual reality account including a motion ID for the consumer and a payment account credential for a payment account associated with the motion ID, the motion ID defining a reference movement by the consumer within the virtual reality setting; and
   a processor in communication with the memory, the processor configured to:
      receive from the consumer, within the virtual reality setting, a selection to purchase a product offered for sale in the virtual reality setting by a merchant;
      prompt the consumer for the motion ID associated with the payment account included in the virtual reality account, so that the payment account can be used to purchase the product;

in response to the prompt, capture a movement of the consumer within the virtual reality setting while masking the movement to other users within the virtual reality setting, such that the other users are unable to perceive the movement of the consumer in the virtual reality setting;

compare the captured movement of the consumer to the reference movement defined by the motion ID, to thereby authenticate the consumer, or not, to the payment account; and initiate a payment account transaction for the product, funded by the payment account, when the captured movement of the consumer matches the reference movement defined by the motion ID and the consumer is authenticated.

10. The system of claim 9, wherein the processor is configured, in connection with capturing the movement of the consumer within the virtual reality setting, to capture coordinates associated with the movement of the consumer within the virtual reality setting at different locations in the virtual reality setting during said movement; and wherein the coordinates are within a three-dimensional grid defining the virtual reality setting.

11. The system of claim 10, wherein the processor is configured, in connection with comparing the captured movement of the consumer to the reference movement defined by the motion ID, to:

compare coordinates associated with the reference movement defined by the motion ID to the captured coordinates associated with the movement of the consumer within the virtual reality setting; and apply at least one margin of error threshold, whereby the captured coordinates are permitted to match the coordinates associated with the reference movement defined by the motion ID even when not identical thereto.

12. The system of claim 11, wherein the processor is configured, in connection with masking the movement of the consumer within the virtual setting, to impose a facade on the virtual reality setting at a location of the consumer.

13. The system of claim 11, wherein the processor is further configured to generate the virtual reality setting and render the virtual reality setting to the consumer, via a computing device associated with the consumer.

14. The system of claim 13, wherein the processor is configured, in connection with masking the movement of the consumer within the virtual setting, to filter the movement of the consumer within the virtual reality setting when rendering the virtual reality setting to the consumer when said captured movement of the consumer matches the reference movement.

15. The system of claim 9, further comprising a computing device associated with the consumer, the computing device configured to display the virtual reality setting to the consumer; and wherein the computing device associated with the consumer is selected from the group consisting of a virtual reality headset, a virtual reality glove, a virtual reality suit, and a combination thereof.

16. The system of claim 9, wherein the processor is configured, in connection with initiating the payment account transaction for the product, to compile an authorization request for the purchase of the product and transmit the authorization request to an acquirer associated with the merchant.

17. A non-transitory computer-readable storage media comprising executable instructions for facilitating a payment account transaction in a virtual reality setting, which when executed by at least one processor, cause the at least one processor to:

receive, from a consumer in a virtual reality setting, a selection to purchase a product;

prompt the consumer for a motion ID associated with at least one payment account available for use in the virtual reality setting to purchase the product, the motion ID defining a reference movement of at least one body part of the consumer in the virtual reality setting;

capture a movement of the at least one body part of the consumer in the virtual reality setting in response to the prompt;

in response to the prompt for the motion ID, mask the movement of the at least one body part of the consumer in the virtual reality setting, whereby another user included in the virtual reality setting is unable to perceive the movement of the at least one body part of the consumer in the virtual reality setting;

compare the captured movement of the at least one body part of the consumer to the reference movement defined by the motion ID, for use in authenticating the consumer to the at least one payment account; and compile an authorization request for the purchase of the product and transmit the authorization request, when the captured movement of the at least one body part of the consumer matches the reference movement defined by the motion ID, thereby initiating a transaction for the purchase of the product funded by the at least one payment account.

18. The non-transitory computer-readable storage media of claim 17, wherein the executable instructions, when executed by the at least one processor, further cause the at least one processor to:

generate a virtual reality account for the consumer and associate the at least one payment account with the virtual reality account, so that the at least one payment account can be used to fund the purchase of the product; and solicit, from the consumer within the virtual reality setting, the reference movement of the at least one body part of the consumer in connection with associating the at least one payment account with the virtual reality account for the consumer.

19. The non-transitory computer-readable storage media of claim 18, wherein the executable instructions, when executed by the at least one processor, further cause the at least one processor, in connection with capturing the movement of the at least one body part of the consumer in the virtual reality setting, to capture coordinates associated with the movement of the at least one body part of the consumer in the virtual reality setting at different locations in the virtual reality setting during said movement; and wherein the executable instructions, when executed by the at least one processor, further cause the at least one processor, in connection with comparing the captured movement of the at least one body part of the consumer to the reference movement defined by the motion ID, to compare coordinates associated with the reference movement defined by the motion ID to the captured coordinates associated with the movement of the at least one body part of the consumer in the virtual reality setting.

20. The non-transitory computer-readable storage media of claim 17, wherein the executable instructions, when executed by the at least one processor, further cause the at least one processor, in connection with masking the movement of the at least one body part of the consumer in the virtual setting, to:
- impose a facade on the virtual reality setting at a location of the at least one body part of consumer; or
- filter the movement of the at least one body part of the consumer in the virtual reality setting when rendering the virtual reality setting to the consumer.

* * * * *